(12) United States Patent
Kitano et al.

(10) Patent No.: US 7,390,569 B2
(45) Date of Patent: Jun. 24, 2008

(54) MULTI-LAYER STRUCTURE FOR PACKAGING

(75) Inventors: Yoshihiro Kitano, Yokohama (JP); Atsushi Kikuchi, Yokohama (JP); Toshiki Yamada, Yokohama (JP); Misa Hanita, Yokohama (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 179 days.

(21) Appl. No.: 10/555,612

(22) PCT Filed: May 12, 2004

(86) PCT No.: PCT/JP2004/006701

§ 371 (c)(1),
(2), (4) Date: Nov. 4, 2005

(87) PCT Pub. No.: WO2004/101273

PCT Pub. Date: Nov. 25, 2004

(65) Prior Publication Data

US 2006/0286366 A1 Dec. 21, 2006

(30) Foreign Application Priority Data

May 19, 2003 (JP) ............................. 2003-140957
Aug. 14, 2003 (JP) ............................. 2003-207590

(51) Int. Cl.
*B32B 9/04* (2006.01)
*B32B 27/06* (2006.01)

(52) U.S. Cl. .................... 428/411.1; 428/480
(58) Field of Classification Search .............. None
See application file for complete search history.

(56) References Cited

U.S. PATENT DOCUMENTS

| 4,082,854 A | * | 4/1978 | Yamada et al. | ............ 426/106 |
|---|---|---|---|---|
| 4,994,313 A | | 2/1991 | Shimizu et al. | |
| 5,021,515 A | | 6/1991 | Cochran et al. | |
| 5,194,478 A | | 3/1993 | Frandsen et al. | |
| 2002/0115768 A1 | | 8/2002 | Kikuchi et al. | |
| 2002/0146527 A1 | | 10/2002 | Kikuchi et al. | |

FOREIGN PATENT DOCUMENTS

| EP | 0 278 403 A2 | 8/1988 |
|---|---|---|
| EP | 0 301 719 A1 | 2/1989 |
| EP | 1 213 326 A1 | 6/2002 |
| EP | 1 253 171 A1 | 10/2002 |
| JP | 2-500846 | 3/1990 |
| JP | 3-505843 | 12/1991 |
| JP | 8-25220 | 3/1996 |
| JP | 2001-72873 | 3/2001 |
| JP | 2001-164002 | 6/2001 |
| JP | 2001-302918 | 10/2001 |
| JP | 2002-241608 | 8/2002 |
| JP | 2003-12944 | 1/2003 |
| WO | WO 89/01012 | 2/1989 |
| WO | WO 90/00578 | 1/1990 |

\* cited by examiner

*Primary Examiner*—Sheeba Ahmed
(74) *Attorney, Agent, or Firm*—Sughrue Mion, PLLC (57) ABSTRACT

A multi-layer structure for packaging formed by at least an inner layer, an outer layer and an intermediate layer, the intermediate layer having an islands-in-a-sea structure comprising a resin A constituting sea portions and a functional resin B constituting island portions, the sea portions occupying not more than 80% of the area of the intermediate layer in cross section, and the inner layer and the outer layer being resins having adhesiveness to said resin A. The adhesion among the layers is improved without providing any particular adhesive layers among the intermediate layer having a function such as gas barrier property and the inner and outer layers, and, besides, transparency is improved.

5 Claims, 6 Drawing Sheets

MULTI-LAYER STRUCTURE FOR PACKAGING

TECHNICAL FIELD

The present invention relates to a multi-layer structure for packaging having a functional resin layer such as a gas barrier resin layer or the like layer as an intermediate layer.

BACKGROUND ART

Polyester resins as represented by a polyethylene terephthalate have excellent properties such as moldability, transparency, mechanical strength and resistance against chemicals, as well as excellent gas barrier property such as against oxygen and can, hence, be used as packaging materials such as films, sheets and bottles in a variety of fields.

In order to enhance the gas barrier property of the above packaging material, further, there has been proposed a packaging material having a functional resin layer comprising a gas barrier material such as a saponified product of an ethylene/vinyl acetate copolymer or a polyamide as an intermediate layer between the inner layer and the outer layer. The above packaging material, however, is accompanied by a problem of interlayer peeling due to low adhesion strength between a functional resin constituting an intermediate layer and a resin (e.g., a polyester resin) constituting the inner and outer layers.

In the multi-layer structure for packaging having the functional resin layer as the intermediate layer between the inner layer and the outer layer, therefore, it is a generally accepted practice to provide adhesive layers among the functional resin layer and the inner and outer layers to increase the adhering strength and to suppress the interlayer peeling.

There has been known, for example, a laminate having graft-modified ethylene/α-olefin random copolymer layers (adhesive layers) provided among the polyester resin layers (inner and outer layers) and a layer of a saponified product of an olefin/vinyl acetate copolymer (functional resin layer) (Japanese Unexamined Patent Publication (Kokai) No. 62-158043).

There has further been proposed a multi-layer container having a mixed resin layer obtained by mixing a gas barrier resin into a polyester resin, the amounts of the polyester resin particles and of the gas barrier resin particles of not larger than 10 μm being not larger than 10%. According to the above multi-layer container, the adhesion among the layers can be improved without decreasing the transparency (Japanese Examined Patent Publication (Kokoku) No. 8-25220).

DISCLOSURE OF THE INVENTION

When adhesive layers are provided among the functional resin layer and the inner and outer layers as represented by the laminate of the above Japanese Unexamined Patent Publication (Kokai) No. 62-158043, however, an extruder is necessary for forming the adhesive layer resulting in an increase in the cost of production.

When the resins exist in a coarsely mixed state in the mixed layer of the gas barrier resin and the polyester resin as taught in the above Japanese Examined Patent Publication (Kokoku) No. 8-25220, further, the gas barrier property possessed by the gas barrier resin is not effectively exhibited and, besides, the mixed layer exhibits deteriorated mechanical strength.

It is therefore an object of the present invention to provide a multi-layer structure for packaging featuring improved adhesion among the layers without providing any particular adhesive layers among the intermediate layer having a function such as gas barrier property and the inner and outer layers.

It is another object of the present invention to provide a multi-layer structure for packaging capable of efficiently exhibiting the function such as gas barrier property and featuring excellent transparency.

According to the present invention, there is provided a multi-layer structure for packaging formed by at least an inner layer, an outer layer and an intermediate layer, said intermediate layer having an islands-in-a-sea structure comprising a resin A constituting sea portions and a functional resin B constituting island portions, the sea portions occupying not more than 80% of the area of the intermediate layer in cross section, and the inner layer and the outer layer being resins having adhesiveness to said resin A.

In the present invention, it is desired that:

1. the island portions have an average domain diameter r of smaller than 3.5 μm and a dispersion parameter Q of larger than 0.68, the average domain diameter r being expressed by the following formula (1), $$r = \sum_{1}^{n} r_i / n \quad (1)$$

and the dispersion parameter Q being expressed by the following formula (2), $$Q = \sum_{1}^{n} Q_i \cdot \ln Q_i / \ln(1/n) \quad (2)$$

wherein $r_i$ is a domain diameter, n is a number of domains, and when a short diameter of domain is $a_i$ and a long diameter of domain is $b_i$, the domain diameter $r_i$ is $r_i = (a_i + b_i)/2$, and $$Q_i = \pi(r_i/2)^2 \Big/ \left( \sum_{1}^{n} \pi(r_i/2)^2 \right)$$

2. the resin A is a polyester;
3. the functional resin B is a gas barrier resin;
4. the intermediate layer has oxygen-absorbing ability;
5. the functional resin B contains an oxidizing organic component and a catalyst;
6. the oxidizing organic component is not existing in the sea portions comprising the resin A; and
7. the functional resin B has a melt viscosity relatively higher than that of the resin A.

In the present invention, it is important that the intermediate layer comprises the resin A and the functional resin B having adhesiveness to the resins forming the inner and outer layers, and has an islands-in-a-sea structure in which the resin A is serving as the sea portions and the functional resin B is serving as the island portions, and the sea portions are occupying not more than 80% of the area of the intermediate layer in any cross section thereof. This enables the functional resin B to exhibit its properties to a sufficient degree and, hence, to maintain excellent interlayer adhesion.

That is, in the multi-layer structure for packaging of the invention, the resins forming the inner and outer layers and the resin A having adhesiveness are existing as sea portions in the intermediate layer. Therefore, the intermediate layer exhibits excellent interlayer adhesion to the inner and outer layers. In the intermediate layer, further, the functional resin B is being dispersed as island portions and, besides, the sea portions are limited not to occupy more than 80% of the area. Therefore, the intermediate layer exhibits excellent gas barrier property inherent in the functional resin B.

For example, even when there is used the resin A having adhesiveness to the resins forming the inner and outer layers, the interlayer adhesion decreases among the inner layer, outer layer and intermediate layer if the resin A is not existing as the sea portions. Further, if the sea portions become greater than 80% of the area in the intermediate layer formed by the resin A, features such as gas barrier property possessed by the functional resin B are not exhibited to a sufficient degree.

In the present invention, further, the average domain diameter (of the undrawn portions) expressed by the above formula (1) is smaller than 3.5 µm in the island portions comprising the functional resin B, and the dispersion parameter Q expressed by the above formula (2) is larger than 0.68, i.e., the island portions comprising the functional resin B have relatively small particle sizes and are existing in the sea portions in a narrow grain size distribution. Therefore, the function such as gas barrier property inherent in the functional resin B is exhibited to a sufficient degree and, besides, excellent transparency is obtained. As for the dispersion parameter Q, the domain diameters of the island portions become a monodispersion when Q=1, i.e., the sizes of the islands are uniformed as Q approaches 1.

Figure 1:
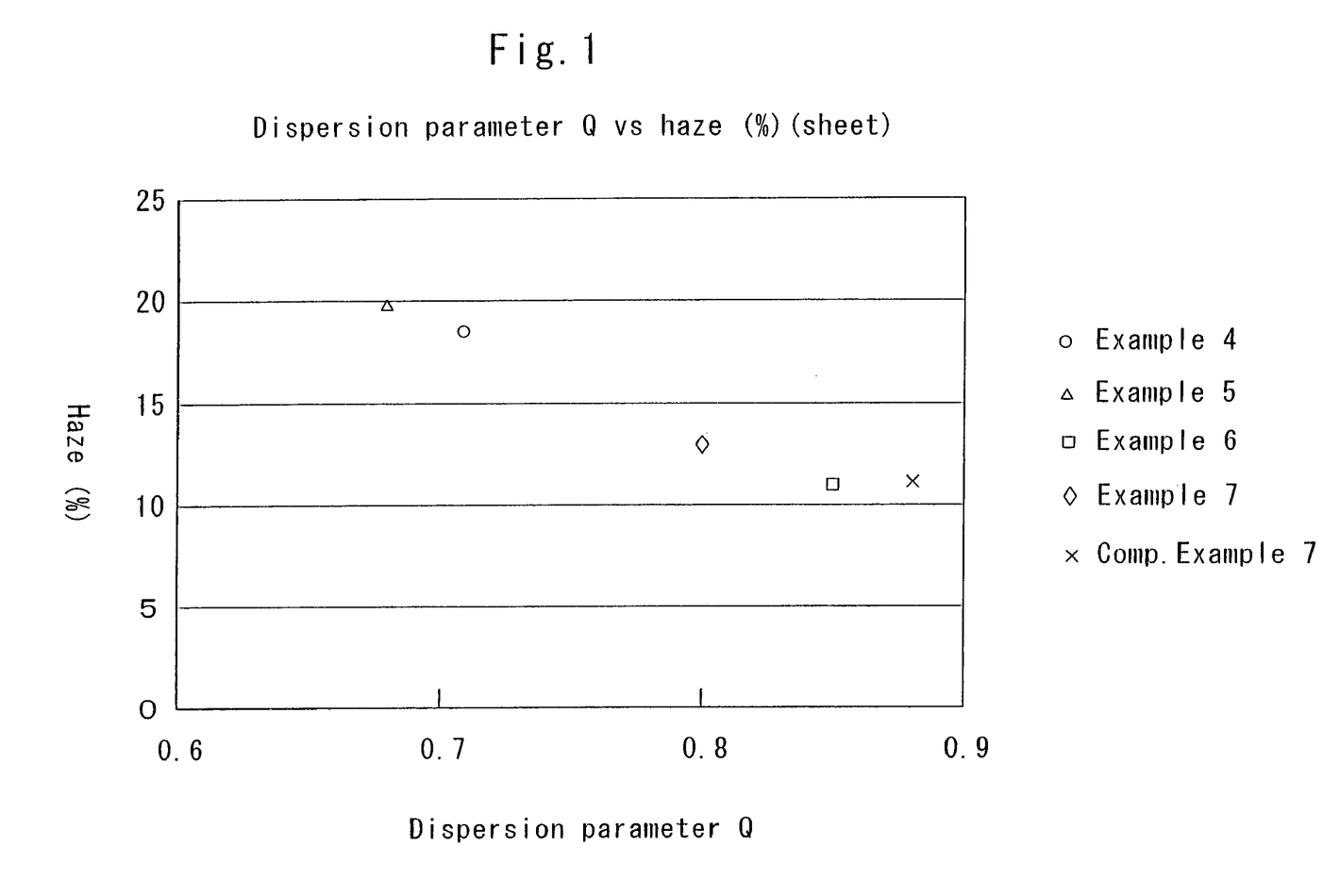
FIG. 1 is a diagram illustrating a relationship between the dispersion parameter Q and the haze of a multi-layer structure sheet.
Figure 2:
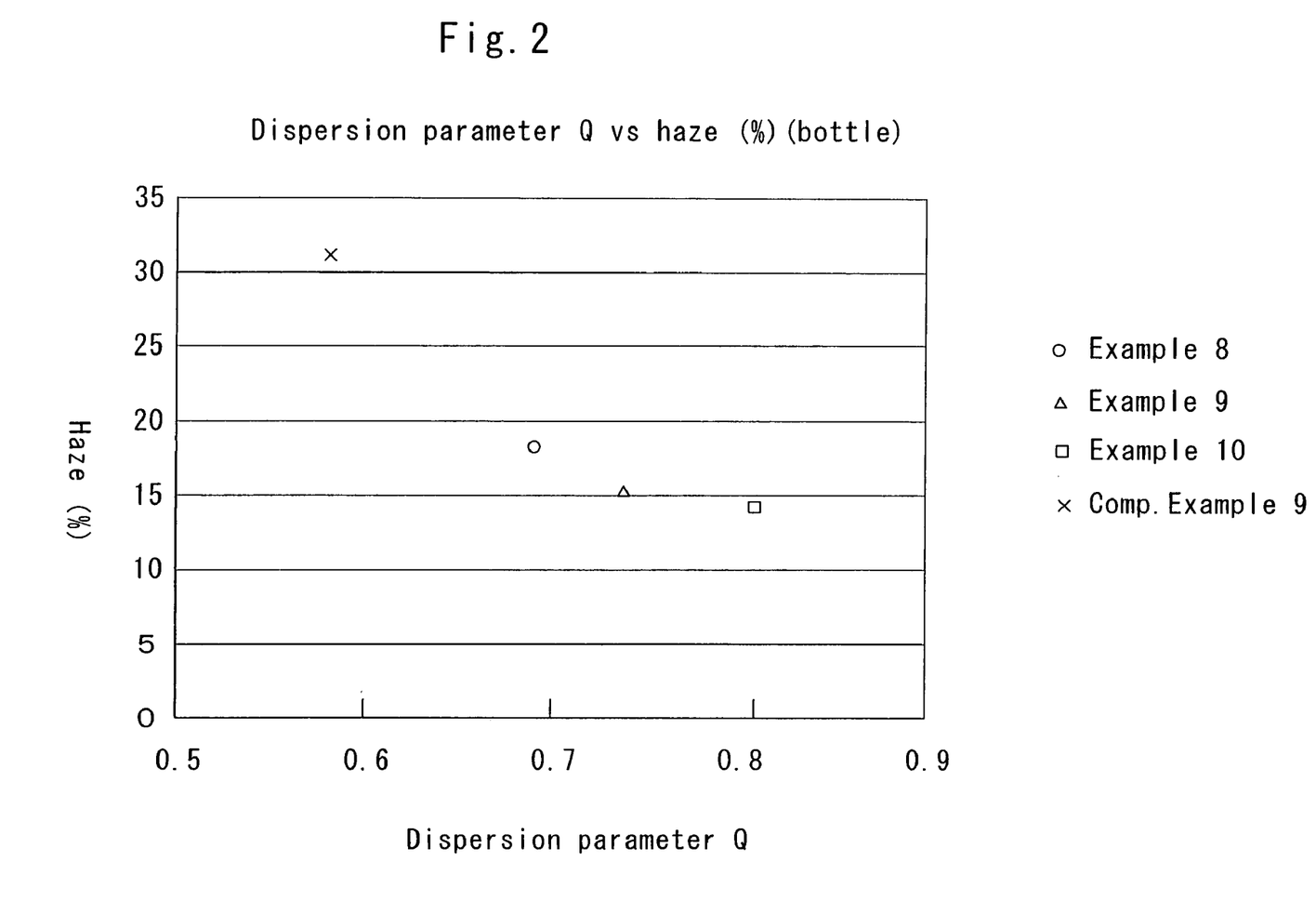
FIG. 2 is a diagram illustrating a relationship between the dispersion parameter Q and the haze of a multi-layer structure bottle.

FIG. 1 is a diagram illustrating a relationship between the dispersion parameter Q of a multi-layer structure sheet of the present invention and the haze (%) of the sheet of when the multi-layer structure sheet is drawn into 3 times ×3 times in the longitudinal and transverse directions. As will be obvious from FIG. , the haze decreases and the transparency increases as the dispersion parameter Q representing the grain size distribution of the island portions approaches 1. In the multi-layer structure for packaging for which transparency is required and, particularly, in the case of a bottle, in general, it is desired that the haze is not larger than 20%. In the multi-layer structure of the present invention as will be obvious from FIG. 2 which shows a relationship between the dispersion parameter Q and the haze of a multi-layer bottle, the haze becomes smaller than 20% when the dispersion parameter Q is near 0.68, from which it is obvious that a satisfactory transparency is maintained.

As will be described later, further, it is desired that the island portions have an average domain diameter of not larger than 3.5 µm to fully draw the characteristics of the functional resin B constituting the island portions and to enhance the mechanical strength thereof. As the island portions have an average domain diameter of smaller than 3.5 µm and, preferably, 3 µm and exist in a narrow particle size distribution, it is allowed to fulfill all of transparency, functions such as gas barrier property and mechanical strength.

According to the invention, further, when the functional resin B contains an oxidizing organic component and a catalyst, it is particularly desired that the oxidizing organic component exists in the island portions only of the functional resin B but does not exist in the sea portions that comprise the resin A from the standpoint of improving the transparency.

Figure 3:
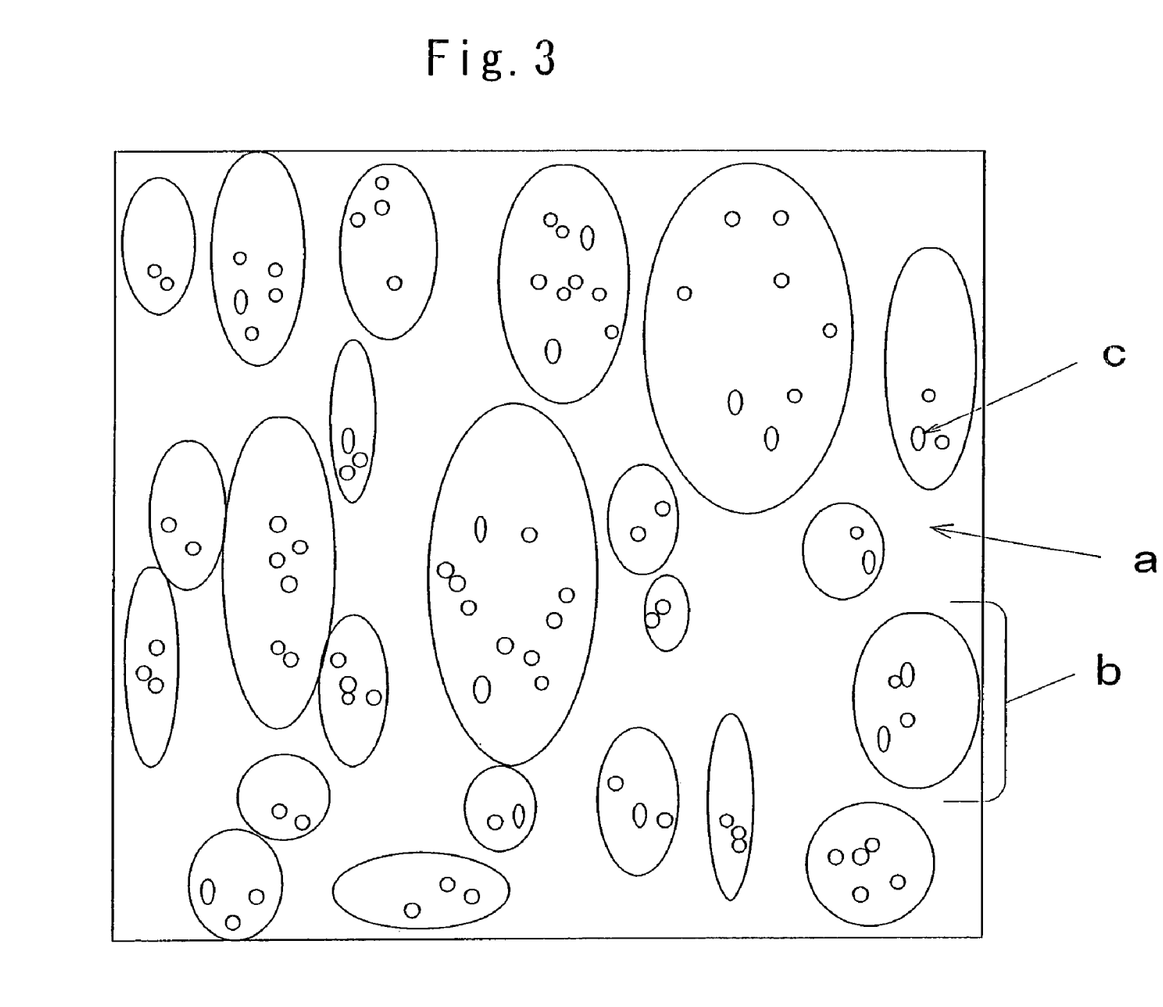
FIG. 3 is a schematic diagram of an electron microphotograph of a sheet comprising a dry-blend of a polyester resin (resin A) and a functional resin B that includes an oxidizing organic component, a transition metal catalyst and a polyamide resin.
Figure 4:
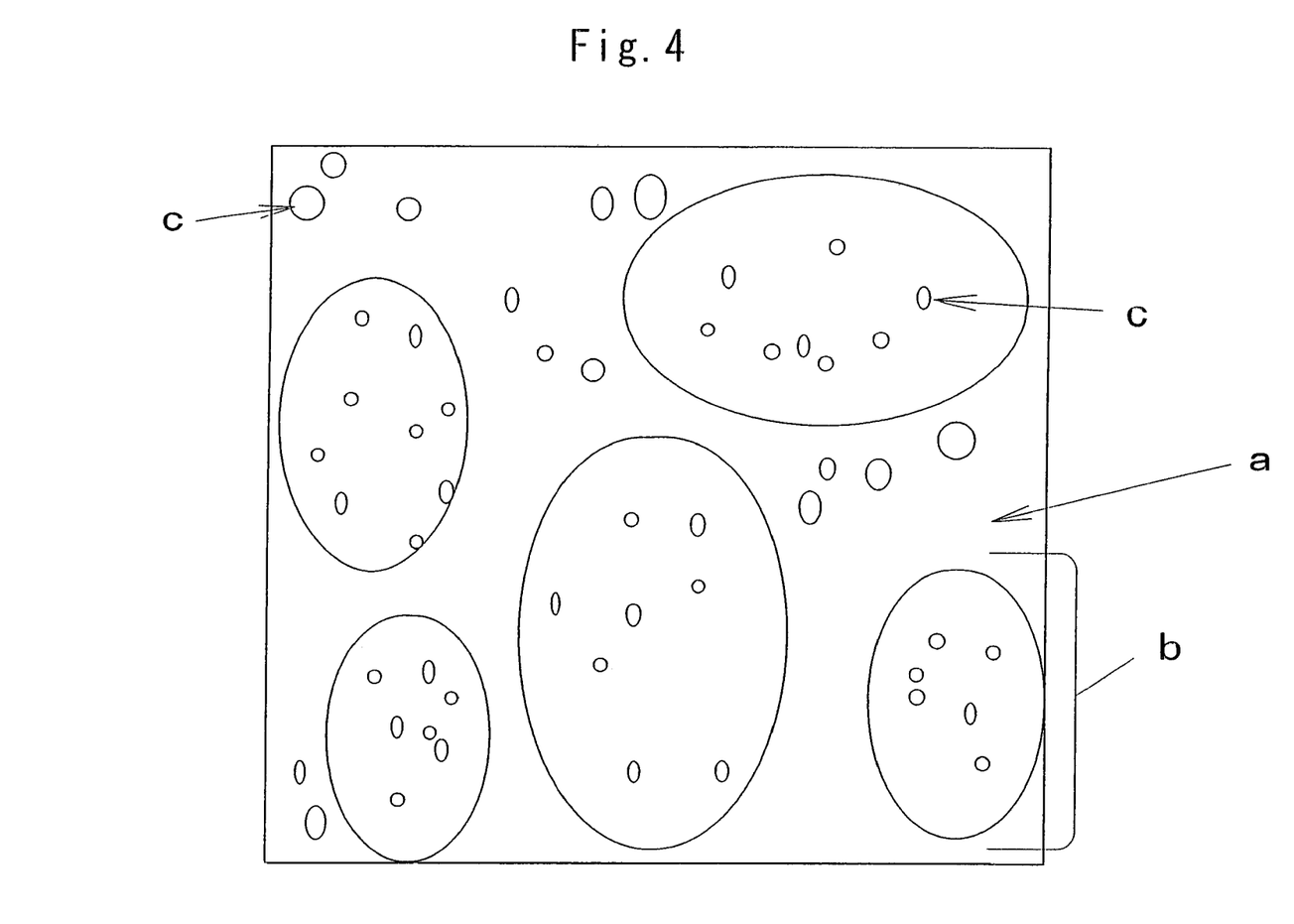
FIG. 4 is a schematic diagram of an electron microphotograph of a sheet comprising a blend of four components which are a polyester resin, a polyamide resin, an oxidizing organic component and a transition metal catalyst.

FIG. 3 is a schematic diagram of an electron microphotograph of a sheet obtained by injection-molding a dry-blend of a polyester resin as a resin A and an oxygen-absorbing resin composition obtained by biaxially kneading a polyamide resin, an oxidizing organic component and a transition metal catalyst, as a functional resin B at a weight ratio of 50:50. FIG. 4 is a schematic diagram of an electron microphotograph of a sheet obtained by injection-molding a biaxially kneaded blend of four components which are a polyester resin (resin A), a polyamide resin, an oxidizing organic component and a transition metal catalyst constituting an oxygen-absorbing resin composition (functional resin B).

FIGS. 3 and 4 are both forming islands-in-a-sea structures comprising island portions (b) of the oxygen-absorbing gas barrier resin composition in the sea portion (a) of the polyester resin. In FIG. 3, however, the oxidizing organic component (c) is existing in only the island portions comprising the polyamide resin while in FIG. 4, the oxidizing organic component is existing not only in the island portions but also in the polyester resin of the sea portion.

Figure 5:
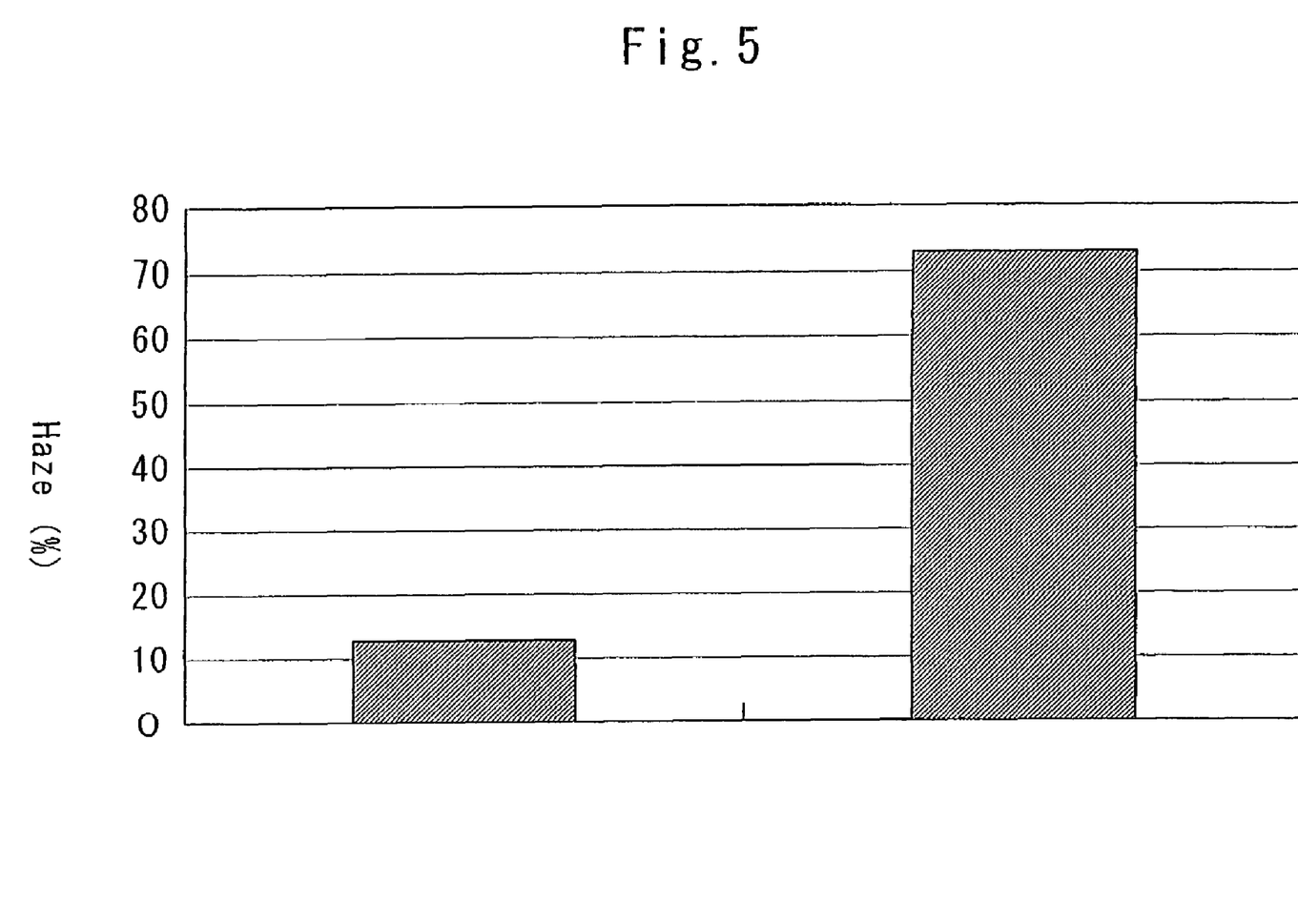
FIG. 5 is a diagram illustrating the hazes of the sheets of FIGS. 3 and 4 that are drawn into 3 times×3 times in the longitudinal and transverse directions.

FIG. 5 is a diagram illustrating the hazes of the extrusion-molded sheets of FIGS. 3 and 4 that are drawn into 3 times×3 times in the longitudinal and transverse directions. As will be obvious from FIG. 5, the sheet (FIG. 3) containing the oxidizing organic component in the island portions only has a haze of about 12% featuring excellent transparency. On the other hand, the sheet containing the oxidizing organic component not only in the island portions but also in the sea portion of FIG. 4, has a haze of larger than 60% exhibiting very inferior transparency. The haze increases as described above depending upon the state of the oxidizing organic component probably because the oxidizing organic component used in the present invention is existing not only in the island portions but also in the sea portion resulting in an increase in the scattering points of light. Besides, the compatibility is not good between the oxidizing organic component and the polyester resin which constitutes the sea portion. Therefore, the oxidizing organic component in the sea portion is existing in the form of particles that scatter light causing an increase in the haze.

BEST MODE FOR CARRYING OUT THE INVENTION

Figure 6:
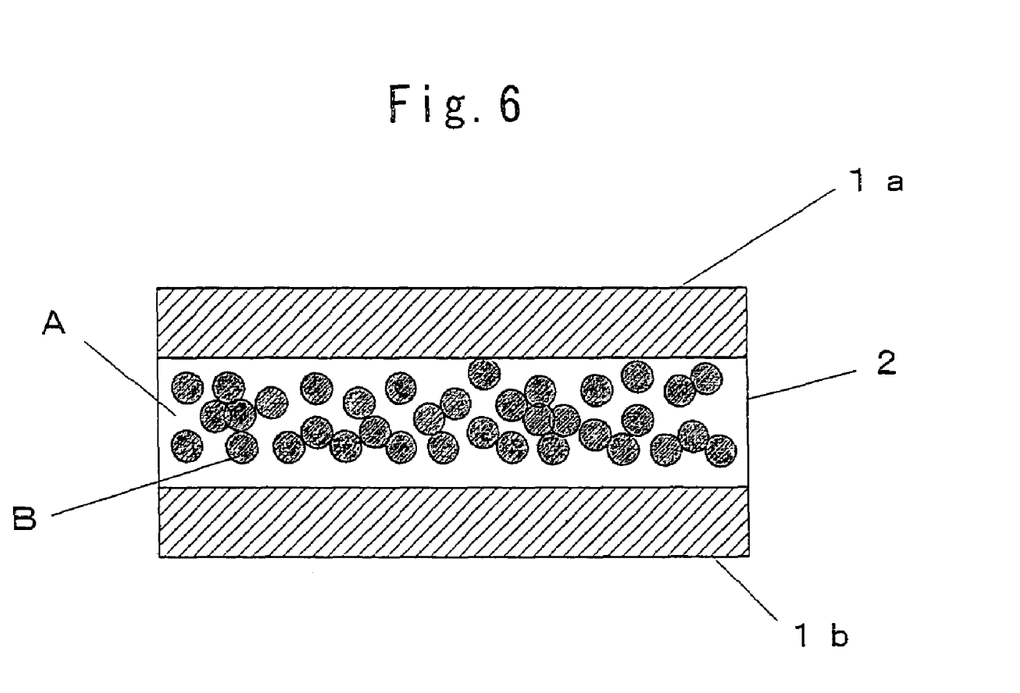
FIG. 6 is a view illustrating a representative layer constitution of a multi-layer structure for packaging of the present invention.

FIG. 6 is a view illustrating a representative layer constitution of a multi-layer structure for packaging of the present invention. As will be obvious from FIG. 6, the multi-layer structure includes three layers, i.e., an inner layer 1a, an outer layer 1b, and an intermediate layer 2 formed therebetween. No adhesive layer is existing among the inner layer la, outer layer 1b and intermediate layer 2 for adhering them together.

(Inner Layer 1a and Outer Layer 1b)

As the resins for constituting the inner and outer layers 1a and 1b according to the present invention, there can be used any resin that has heretofore been used for the containers such as cups and bottles without limitation. Generally, however, there is used an olefin resin or a polyester resin from the standpoint of moldability and transparency.

As the olefin resin, there can be exemplified a polyethylene such as low-density polyethylene (LDPE), middle-density polyethylene (MDPE), high-density polyethylene (HDPE), linear low-density polyethylene (LLPDE) or linear very low-density polyethylene (LVLDPE), or polypropylene, ethylene/propylene copolymer, polybutene-1, ethylene/butene-1 copolymer, propylene/butene-1 copolymer, ethylene/propylene/butene-1 copolymer, ethylene/vinyl acetate copolymer, or ionically crosslinked olefin copolymer (ionomer).

In the present invention, the polyester resin is most desirably used. In particular, there is used the one that can be biaxially draw-blow-molded and crystallized, such as a thermoplastic polyester like polyethylene terephthalate, polybutylene terephthalate or polyethylene naphthalate, or a blend of these polyesters and a polycarbonate or an arylate resin. In the present invention, it is desired that most (generally, not less than 8.0 mol %) of the ester recurring units is an ethylene terephthalate unit of a polyethylene terephthalate (PET) polyester having a glass transition point (Tg) of 50 to 90° C. and, particularly, 55 to 80° C., and a melting point (Tm) of 200 to 275° C. and, particularly, 220 to 270° C.

As the PET polyester, the homopolyethylene terephthalate can be most desirably used but still there can be preferably used a copolymerized polyester having an ethylene terephthalate unit content lying in the above range.

In the copolymerized polyester, examples of the dibasic acid other than the terephthalic acid include aromatic dicarboxylic acids such as isophthalic acid, phthalic acid and naphthalinedicarboxylic acid; alicyclic dicarboxylic acids such as cyclohexanedicarboxylic acid; and aliphatic dicarboxylic acids such as succinic acid, adipic acid, sebacic acid, and dodecanedioic acid, which may be used in one kind or in a combination of two or more kinds. As the diol components other than the ethylene glycol, there can be exemplified propylene glycol, 1,4-butanediol, diethylene glycol, 1,6-hexylene glycol, cyclohexane dimethanol, and ethylene oxide adduct of bisphenol A.

The resin that constitutes the inner and outer layers 1a and 1b must have a molecular weight which is at least large enough for forming a film. When the resin is, for example, the above-mentioned polyester, it should have an intrinsic viscosity (I.V) of 0.6 to 1.40 dl/g and, particularly, 0.63 to 1.30 dl/g.

The inner layer 1a and the outer layer 1b need not necessarily be made of the same kind of resin so far as they exhibit adhesiveness to the resin A that constitutes the sea portion in the intermediate layer. For instance, the outer layer 1b may be made of a polyester and the inner layer 1a may be made of a functional resin such as a gas-barrier resin that will be described later.

As required, further, the inner and outer layers 1a and 1b may be blended with a lubricant, a reforming agent, a pigment, an ultraviolet-ray absorbing agent, etc.

(Intermediate Layer 2)

As will be obvious from FIG. 6, the intermediate layer 2 has an islands-in-a-sea structure in which the resin A serves as the sea portion (or matrix) and the functional resin B serves as island portions.

[Functional resin B]

As the functional resin B, there can be used, for example, a gas-barrier resin. A representative example of the gas-barrier resin is an ethylene/vinyl alcohol copolymer, such as a saponified product of a copolymer obtained by saponifying an ethylene/vinyl acetate copolymer having an ethylene content of 20 to 60 mol % and, particularly, 25 to 50 mol %, so that the degree of saponification is not lower than 96% and, particularly, not lower than 99 mol %. The ethylene/vinyl alcohol copolymer (saponified product of ethylene/vinyl acetate copolymer) must have a molecular weight large enough for forming a film and, desirably, should have an intrinsic viscosity of not smaller than 0.01 dl/g and, particularly, not smaller than 0.05 dl/g as measured in a mixed solvent of phenol and water at a weight ratio of 85/15 at 30° C.

Examples of the gas-barrier resin other than the ethylene/vinyl alcohol copolymer include polyamides such as nylon 6, nylon 6,6, nylon 6/6,6 copolymer, poly(m-xylylene adipamide) (MXD6), nylon 6,10, nylon 11, nylon 12 and nylon 13. Among these polyamides, it is preferred to use the one that has the amide groups in a number of 5 to 50 and, particularly, 6 to 20 per 100 carbon atoms.

These polyamides, too, must have molecular weights large enough for forming a film and must, desirably, have relative viscosities of not smaller than 1.1 and, particularly, not smaller than 1.5 as measured in a concentrated sulfuric acid (concentration of 1.0 g/dl) at 30° C.

Among them, a poly(m-xylylene adipamide) having terminal amino groups in an amount of smaller than 40 eq/$10^6$ g has an excellent oxidizing function, and can be used as the functional resin B together with a transition metal catalyst that will be described later, i.e., can be used as the intermediate layer so as to exhibit an oxygen-absorbing function so as to absorb and trap oxygen. It is further allowable to blend an oxidizing organic component and a transition metal catalyst (oxidizing catalyst) in the gas barrier resin to impart oxygen-absorbing property to the gas-barrier resin used as the functional resin B, i.e., to impart oxygen-absorbing ability to the intermediate layer. That is, by oxidizing the oxidizing organic component, oxygen is absorbed and trapped, and the gas-barrier resin exhibits an enhanced oxygen barrier function. The transition metal catalyst is blended to promote the oxidation of the oxidizing polymer. These oxidizing organic component and the transition metal catalyst, too, are dispersed together with the functional resin B like islands.

In this case, oxygen is absorbed and trapped by the oxidizing organic component and the transition metal catalyst preventing the gas-barrier resin from being deteriorated by oxidation, preventing interlayer peeling and preventing a drop in the gas barrier property. As a preferred example, the functional resin B includes a metaxylylenediadipamide having terminal amino groups in an amount of not smaller than 40 eq/$10^6$ g, an oxidizing organic component and a transition metal catalyst.

As the oxidizing organic component with which the gas barrier resin is blended, there can be exemplified a polymer containing an ethylenically unsaturated group. Namely, this polymer has a carbon-carbon double bond which is easily oxidized with oxygen to thereby absorb and trap oxygen.

The polymer having the ethylenically unsaturated group is derived from a monomer of polyene. Though not limited thereto only, preferred examples of the polyene include conjugated dienes such as butadiene and isoprene; chain non-conjugated dienes such as 1,4-hexadiene, 3-methyl-1,4-hexadiene, 4-methyl-1,4-hexadiene, 5-methyl-1,4-hexadiene, 4,5-dimethyl-1,4-hexadiene, and 7-methyl-1,6-octadiene; cyclic non-conjugated dienes such as methyltetrahydroindene, 5-ethylidene-2-norbornene, 5-methylene-2-norbornene, 5-isopropylidene-2-norbornene, 5-vinylidene-2-norbornene, 6-chloromethyl-5-isopropenyl-2-norbornene, and dicyclopentadiene; and trienes such as 2,3-diisopropylidene-5-norbornene, 2-ethylidene-3-isopropylidene-5-norbornene, 2-propenyl-2,2-norbornadiene, and chloroprenes.

Namely, it is allowable to use, as an oxidizing polymer, a hbmopolymer of the polyene or a random copolymer or a block copolymer of a combination of two or more kinds of the polyenes or of a combination thereof with other monomers. As the other monomers to be copolymerized with the above polyene, there can be exemplified an α-olefin having 2 to 20 carbon atoms, such as ethylene, propylene, 1-butene, 4-methyl-1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadene, 1-nonadecene, 1-eicosene, 9-methyl-1-decene, 11-methyl-1-dodecene, and 12-ethyl-1-tetradecene. There can be further used styrene, vinyltriene, acrylonitrile, methacrylonitrile, vinyl acetate, methyl methacrylate and ethyl acrylate.

In the present invention, among the polymers derived from the above polyene, it is desired to use polybutadiene (BR), polyisoprene (IR), natural rubber, nitrile-butadiene rubber (NBR), styrene-butadiene rubber (SBR), chloroprene rubber and ethylene-propylene-diene rubber (EPDM), to which only, however, the invention is not limited. It is desired that the iodine value is not smaller than 100 and, particularly, about 120 to about 196.

In addition to the above polymers having the ethylenically unsatruated groups, there can be used polymers which can be easily oxidized by themselves, such as polypropylene, ethylene/carbon oxide copolymer and the like as oxidizing organic components.

In the present invention, it is desired that the above oxidizing polymer and the copolymer thereof have viscosities at 40° C. in a range of 1 to 200 Pa·s. It is further desired that the oxidizing organic component comprising the oxidizing polymer or a copolymer thereof is used in an amount of 1 to 15 parts by weight and, particularly, in an amount of 2 to 10 parts by weight per 100 parts by weight of the gas-barrier resin.

In the transition metal catalyst used together with the above oxidizing organic component, preferred examples of the transition metal include metals the Group VIII of periodic table, such as iron, cobalt and nickel. There can be further used metals of the Group I, such as copper and silver, metals of the Group IV, such as tin, titanium and zirconium, metals of the Group V, such as vanadium, metals of the Group VI, such as chromium, and metals of the Group VII such as manganese. Among them, cobalt is particularly suited for the object of the present invention since it greatly promotes the oxygen-absorbing property (oxidation of the oxidizing organic component).

Usually, the transition metal catalyst is used in the form of an inorganic solvent, an organic salt or a complex of the above transition metal having a low valency.

As the inorganic salt, there can be exemplified a halide such as a chloride, an oxysalt of sulfur such as a sulfate, an oxyacid salt of nitrogen such as a nitrate, a phosphorus oxysalt such as a phosphate, and a silicate.

As the organic salt, there can be exemplified carboxylate, sulfonate, and phosphonate. Among them, however, the carboxylate is desired for the object of the invention. Its concrete examples include transition metal salts of acetic acid, propionic acid, isopropionic acid, butanoic acid, isobutanoic acid, pentanoic acid, hexanoic acid, heptanoic acid, isoheptanoic acid, octanoic acid, 2-ethylhexanoic acid, nonanoic acid, 3,5,5-trimethylhexanoic acid, decanoic acid, neodecanoic acid, undecanoic acid, lauric acid, myristic acid, palmitic acid, margaric acid, stearic acid, arachic acid, linderic acid, tsuzuic acid, petroselinic acid, oleic acid, linolic acid, linoleic acid, arachidonic acid, formic acid, oxalic acid, sulfamic acid, and naphthenic acid.

Complexes of transition metals may be those with β-diketone or β-keto-acid ester. As the β-diketone or β-keto-acid ester, there can be used, for example, acetylacetone, ethyl acetoacetate, 1,3-cyclohexadione, methylene bis-1,3-cyclohexadione, 2-benzyl-1,3-cyclohexadione, acethyltetralone, palmitoyltetralone, stearoyltetralone, benzoyltetralone, 2-acetylcyclohexanone, 2-benzoylcyclohexanone, 2-acetyl-1,3-cyclohexadione, benzoyl-p-chlorobenzoylmethane, bis(4-methylbenzoyl)methane, bis(2-hydroxybenzoyl)methane, benzoylacetone, tribenzoylmethane, diacetylbenzoylmethane, stearoylbenzoylmethane, palmitoylbenzoylmethane, lauroylbenzoylmethane, dibenzoylmethane, bis(4-chlorobenzoyl)methane, benzoylacetylphenylmethane, stearoyl(4-methoxybenzoyl)methane, butanoylacetone, distearoylmethane, stearoylacetone, bis(cyclohexanoyl)methane and dipivaroylmethane.

In the present invention, it is desired that the above transition metal catalyst is blended in an amount of 10 to 1000 ppm and, particularly, 50 to 500 ppm calculated as a metal per the gas-barrier resin.

In the present invention, further, the above oxidizing organic component is easily oxidized by itself, and is oxidized to exhibit a function of trapping oxygen. It is therefore allowed to use the above oxidizing organic component together with the catalyst as the functional resin B. In particular, when the inner and outer layers 1a and 1b are formed of a polyester such as polyethylene terephthalate, use of the oxidizing organic component together with the catalyst as the functional resin B makes it possible to guarantee a sufficiently high oxygen shut-off property since the inner and outer layers 1a and 1b themselves have a relatively high gas barrier property.

Here, the gas-barrier resin which is the functional resin B of the intermediate layer can be blended with the oxidizing organic component and with the transition metal catalyst (oxidizing catalyst) by a method according to which the resin A is directly blended with the gas-barrier resin which is the functional resin B, the oxidizing organic component and the transition metal catalyst (oxidizing catalyst) to form the intermediate layer, or a method according to which the functional resin B and the resin A are kneaded and pelletized in advance by using a biaxial extruder, and the pellets thereof are supplied to a hopper of an extruder for forming the intermediate layer to thereby form the intermediate layer.

In the former case, the gas barrier resin (functional resin B), the oxidizing organic component and the transition metal catalyst are dispersed in the sea portion of the resin A. In the latter case, too, the oxidizing organic component and/or the transition metal catalyst often-partly exist in the sea portion of the resin A. In order to exclude the oxidizing organic component from the sea portion of the resin A as described above, therefore, it is desired that the gas-barrier resin, oxidizing organic component and the transition metal catalyst are formed into a stranded resin composition by using a biaxial extruder while effecting the deaeration, the stranded resin composition is pelletized and is dry-blended with the resin A, and the mixture is supplied to the hopper of the extruder for forming the intermediate layer thereby to form the intermediate layer.

[Resin A]

In the present invention, the resin A (hereinafter called matrix resin) constituting the sea portion in the intermediate layer 2 has adhesiveness to the resin constituting the inner layer 1a and the outer layer 1b.

Namely, there is used, as the matrix resin A, the one that has heretofore been used as an adhesive resin for forming adhesive layer, such as carboxylic acid like maleic acid, itaconic acid, anhydrides of these carboxilic acids, or a graft-modified olefin resin which is graft-modified with an amide or an ester. In the graft-modified olefin resin, the olefin resin that is to be graft-modified is preferably a polyethylene, a polypropylene or an ethylene/α-olefin copolymer. In addition to the graft-modified olefin resin, there can be used, for example, an ethylene/acrylic acid copolymer, an ionically crosslinked olefin type copolymer, an ethylene/vinyl acetate copolymer, a copolymerized polyester and a copolymerized polyamide as adhesive resins.

From the standpoint of adhesion, it is desired that these adhesive resins include carbonyl groups (>C=O) in the main chain or in the side chain in an amount of 1 to 100 meq/100 g of the resin and, particularly, 10 to 100 meq/100 g of-the resin.

In the present invention, further, the resin forming the inner layer 1a or the outer layer 1b can be used as the matrix resin A. That is, the above resin exhibits a high affinity to the inner and outer layers 1a and 1b, and a favorable adhesiveness thereto, as a matter of course.

When, for example, the inner and outer layers 1a and 1b are made of a polyester, the polyester can be used as the resin A. When the resin forming the inner and outer layers 1a and 1b is used as the matrix resin A, it is allowed to produce a multi-layer structure for packaging using resin materials of a decreased number of kinds offering very great advantage from the standpoint of simplifying the steps of production and decreasing the cost of production.

[Islands-in-a-Sea Structure]

In the multi-layer structure for packaging according to the present invention as described already, the intermediate layer 2 has an islands-in-a-sea structure in which the matrix resin A serves as the sea portion and the functional resin B serves as the island portions. Owing to the islands-in-a-sea structure, the interlayer adhesion is improved among the intermediate layer 2, inner layer 1a and outer layer 1b without the need of providing any particular adhesive layers and, at the same time, the function such as oxygen barrier property is exhibited to a sufficient degree.

That is, the matrix resin A constituting the sea portion has adhesiveness to the inner and outer layers 1a and 1b to enhance the interlayer adhesion among the intermediate layer 2, inner layer 1a and outer layer 1b. Further, the functional resin B dispersed like islands exhibits the function such as the gas barrier property. In the present invention, in particular, the functional resin B is dispersed like islands which are independently sealed in the matrix resin A effectively avoiding a drop in the gas barrier property caused by moisture and exhibiting properties for extended periods of time maintaining stability.

The phase structure of a blend of two components comprising the matrix resin A and the functional resin B varies depending upon the forming conditions such as melting viscosity, composition, mixing method, shape of screws, rotational speed, temperature and the like. Among them, what are particularly important are the melt viscosity and composition.

To form the above-mentioned islands-in-a-sea structure from the standpoint of the melt viscosity, it is desired to so combine the matrix resin A and the functional resin B together that the functional resin B possesses a melt viscosity higher than that of the matrix resin A. That is, to form the above intermediate layer 2, the matrix resin A and the functional resin B are melted and mixed together in an extruder. Here, the resin having a high melt viscosity forms the island portions and the resin having a low melt viscosity forms the sea portion. In the present invention, therefore, it is desired that the functional resin B has a melt viscosity higher than that of the matrix resin A.

In melt-mixing the resins, further, the component of a large amount tends to form the sea portion and the component of a small amount tends to form the island portions. To achieve the desired islands-in-a-sea structure, therefore, attention must be given to a relationship between the melt viscosity and the composition. In the present invention, it is desired to use the matrix resin A forming the sea portion in an amount of not smaller than 20% by weight from the standpoint of forming the islands-in-a-sea structure. In order for the island portions to possess an average domain diameter of smaller than 3.5 μm, it is desired to use the functional resin B in an amount in a range of 20 to 50% by weight, i.e., to use the matrix resin A in an amount in a range of 50 to 80% by weight.

In the present invention, further, it is necessary that the sea portion-formed by the matrix resin A occupies not more than 80% and, preferably, not more than 70% of the area of the intermediate layer in any cross section. That is, when the sea portion exists in too excess amounts, the island portions are formed little by the functional resin B. Therefore, the functional resin B fails to exhibit its properties such as gas barrier property to a sufficient degree.

In the present invention, further, it is desired that the island portions formed by the functional resin B have an average long diameter in a range of 0.1 to 50 μm and, particularly, 0.3 to 30 μm. Most desirably, particle sizes are so controlled that the island portions have an average domain diameter as expressed by the following formula (1) of smaller than 3.5 μm, $$r = \sum_{1}^{n} r_i / n \qquad (1)$$

wherein $r_i$ is a domain diameter, n is a number of domains, and when a short diameter of domain is $a_i$ and a long diameter of domain is $b_i$, the domain diameter $r_i$ is $r_i=(a_i+b_i)/2$, from the standpoint of drawing the properties such as gas barrier property of the functional resin B to a sufficient degree and to maintain transparency. When the particle size of the island portions is too great, it is probable that the function such as gas barrier property and mechanical strength may decrease.

The particle size can be controlled by adjusting the mixing ratio of the resin A and the functional resin B. Or, when the functional resin B contains the oxidizing organic component and the transition metal catalyst, the particle size can be controlled by adjusting the mixing conditions such as the composition or the blending amount of the oxidizing organic component in the functional resin B, melt viscosity at the time of melt-mixing, mixing time, shearing rate, melting temperature and the like.

As for, for example, the mixing ratio of the resin A and the functional resin B, it is desired that the mixing ratio is in a range of A:B=80:20 to 50:50 on the basis of weight. When a polyene type polymer such as a polybutadiene modified with a maleic anhydride is used as the oxidizing organic component, it is desired that the oxidizing organic component is blended at a ratio of 0.1 to 10% by weight from the standpoint of obtaining the above-mentioned particle size and particle size distribution.

Further, when the functional resin B contains the oxidizing organic component and the catalyst as described above, it is desired that the oxidizing organic component does not exist in the sea portion comprising the resin A from the standpoint of transparency. In order for the oxidizing organic component not to exist in the sea portion comprising the resin A, it is important that the oxidizing organic component does not react with the resin A. Importance further resides in the order of blending the components. Particularly desirably, the functional resin containing the oxidizing organic component and the transition metal is mixed, first, and, then, the resin A is mixed therewith as described earlier.

The intermediate layer 2 having the above-mentioned islands-in-a-sea structure may be blended with various blending agents, such as filler, coloring agent, heat stabilizer, weather-proofing agent, antioxidant, aging stabilizer, photo-stabilizer, ultraviolet-ray absorber, antistatic agent, lubricant such as metal soap or wax, reforming resin and rubber within ranges in which they do not spoil the islands-in-a-sea structure and the formability.

(Layer Constitution)

Typically, the multi-layer structure for packaging according to the invention has a layer constitution as illustrated in FIG. 6. The invention, however, is in no way limited to the above layer constitution only. For example, the resin layers of the same kind as the inner and outer layers 1a, 1b, or scrap layers of scrap resins produced in the step of forming the containers can be provided between the inner and outer layers 1a and 1b so far as the intermediate layer having the island-in-a-sea structure is directly neighboring the inner and outer layers 1a and 1b without interposing any particular layers such as adhesive layers. Or, there may be formed a plurality of intermediate layers 2 having the islands-in-a-sea structure.

Though there is no particular limitation in the thicknesses of the layers constituting the multi-layer structure for packaging of the invention, the inner layer 1a and the outer layer 1b have thicknesses, generally, in a range of 10 to 1000 µm and, particularly, 250 to 500 µm, and the intermediate layer 2 has a thickness in a range of 1 to 300 µm and, particularly, 3 to 50 µm.

(Multi-Layer Structure for Packaging)

The multi-layer structure for packaging of the invention can assume the form of packaging containers such as bottles and cups, films, sheet, parisons and pipes for forming bottles and tubes, and intermediate products such as preforms for forming bottles and tubes. Passing through the intermediate products, the multi-layer structure for packaging of the invention can finally be used as packaging materials such as cups, trays, bottles, tubular containers, pouches, container lids, etc.

By using, for examples, extruders and injection machines of numbers equal to the number of the layers, there can be formed packaging containers and intermediate products through the known extrusion molding and injection molding and, as required, through the compression molding. In this case, the multi-layer structure for packaging of the invention is quite free of the adhesive layer offering advantage from the standpoint of decreasing the numbers of the extruders and the injection machines that are used and the cost of production.

The film which is an intermediate product can be biaxially stretched, as required, so as to be used as a biaxially stretched film.

The bottle is easily molded from a parison, a pipe or a preform by pinching off the extruded product by using a pair of split molds, and by blowing a fluid therein.

Further, the pipe or the preform is cooled, heated to a drawing temperature, drawn in the axial direction, and is blow-drawn in the circumferential direction by the fluid pressure to obtain a draw-blown bottle.

Moreover, the film or the sheet is subjected to the vacuum molding, compressed air molding, inflation molding, or plug assist molding to obtain packaging containers of the shapes of cups and trays, and container lids.

The films can be used as packaging bags (pouches) of various forms, and the bags can be produced by a known method.

The multi-layer structure for packaging of the invention is very useful as a container for preventing a drop in the flavor of the-contents caused by oxygen.

The multi-layer structure for packaging of the invention can be applied to the containers for containing a variety of contents that are liable to be deteriorated by the presence of oxygen, such as beverages like beer, wine, fruits juice, carbonated soft drinks, etc., as well as fruits, nuts, vegetables, meats, infant's foods, coffee, jam, mayonnaise, ketchup, edible oils, dressings, sauces, food boiled down in soy, milk products, medicines, cosmetics, gasoline and the like.

The multi-layer structure for packaging of the invention features excellent transparency, and can be suitably used even for packaging containers that require transparency.

EXAMPLES

The invention will be further described by way of the following Examples to which only, however, the invention is in no way limited.

[Evaluation of Phase Structure Using a Scanning Electron Microscope (SEM) and Evaluation of Adhesion]

Test pieces measuring 2 mm wide and 30 mm long were cut out from multi-layer films and multi-layer bottles, and the sectional surfaces on one side thereof were surfaced by using an ultra-microtome, and were subjected to a pretreatment of depositing Pt thereon by vacuum evaporation in vacuum for 60 seconds with 10 mA. By using a SEM (JMS-6300F: Nihon Denshi Co.), the sectional surfaces of the samples pre-treated with an acceleration voltage of 3 kV were observed to evaluate the phase structure and the area ratio (%) of domains.

Next, the adhesion of the packing materials was evaluated on the basis of judgment that no interface is recognized among the inner layer, outer layer -and intermediate layer (presence of interface) and there is no peeling among the layers when a cutter blade is driven into among the inner layer, outer layer and intermediate layer.

[Measurement of the Amount of Oxygen Permeating through the Multi-Layer Film]

In Examples 1 to 7 and in Comparative Examples 1 and 7, a propylene was laminated onto the multi-layer films that were obtained to form lid members which were, then, heat-sealed onto the oxygen non-permeating cup-like containers of a content of 80 ml [HIRETOFLEX: HR78-84 manufactured by Toyo Seikan Co., polypropylene/steel foil/polypropylene] in a nitrogen atmosphere. The cup-like containers were preserved at 22° C. for 7 days, and the oxygen concentrations in the cup-like containers were measured by using a small high-speed gas chromatography (M200: manufactured by Nihon Tyran Co.). The amounts of permeation of oxygen were calculated from the oxygen concentrations.

[Measurement of Concentrations of Oxygen Dissolved in Water in the Multi-Layer Bottles]

In Examples 8 to 10 and in Comparative Examples 8 and 9, oxygen-free water was produced by using an oxygen-free water production unit (LOW DISSOLVED OXYGEN, manufactured by Miura Kogyo Co.), and the multi-layer bottles that were prepared were filled with oxygen-free water while blowing a nitrogen gas so that no bubble was mixed therein, and were sealed with aluminum caps. After preserved in a constant-temperature constant-humidity chamber maintained at 22° C. and 60% for two weeks, concentrations of oxygen dissolved in water in the multi-layer bottles were measured by using an instrument for measuring oxygen concentration in water (Oxygen Indicator, manufactured by Orbisphere Laboratories).

[Measurement of Melt Viscosities]

By using a device for measuring melt viscosity (CA-PIROGRAPH 1B, manufactured by Toyo Seiki Seisakusho Co.), the melt viscosities were measured under the conditions of a measuring temperature of 270° C., waiting time until the resin temperature is stabilized of 5 minutes, capillary length of 10 mm and capillary diameter of 1.0 mm. Melt viscosities of two kinds of resins to be blended were compared at a shearing rate in a range of 100 to 1000 $sec^{-1}$.

[Measurement of Average Domain Diameter and Number of Domains]

The total numbers of domains were counted by using photographs of islands-in-a-sea structures of multi-layer films or bottles (lower part of neck ring or preform) shot by using a SEM (JMS-6300F: manufactured by Nihon Denshi Co.) at a magnification of 3000 times. By giving attention to the island portions, further, the maximum diameters and the minimum diameters of the domains were measured to find an average domain diameter and a parameter Q representing the distribution width of domain diameters from the above formulas (1) and (2).

[Measurement of Hazes]

Test pieces measuring 40 mm wide and 30 mm long were cut out from the shoulder portions of the bottles so that the layers were not peeled off, and the multi-layer films drawn into 3×3 times and measuring 40 mm wide and 30 mm long were cut out. The above test pieces were measured for their hazes (%) by using S&M COLOR COMPUTER, MODEL SM-4 (manufactured by Suga Shikenki co.).

Example 1

As a functional resin B, a poly(m-xylylene adipamide) (MXD6) resin pellet immediately after having unsealed the moisture-proof package [6121, manufactured by Mitsubishi Gas Kagaku Co.] is used, and there is used, as a polyethylene terephthalate (PET) resin, RT543C (manufactured by Nihon Unipet Co.) dried at 150° C. for 4 hours. The PET resin was fed into an extruder for forming inner or outer layer, and a dry blend of the PET resin (resin A) and the functional resin B (weight ratio; 50:50) was fed into an extruder for forming an intermediate layer. The extruded material from these extruders is molded by using Laboplust-mill (manufactured by Toyo Seiki Seisakusho Co.) to prepare a two kind-three layer film (thickness of each layer; 100 μm, molding temperature; 270° C.). The phase structure in cross section of the multi-layer film was observed by using a SEM to evaluate the phase structure and the area ratio (%) of domain and the presence of interlayer peeling.

Further, the above film was heat-sealed as a lid member by using the above polypropylene sheet as a heat-sealing layer. After preserved for 7 days at 22° C., the amount of oxygen that has permeated was measured to evaluate oxygen barrier property.

Further, the two kinds of resins that were dry-blended were measured for their melt viscosities.

Example 2

A two-kind-three-layer film and a lid member were prepared, observed by using the SEM, evaluated for their barrier properties and were measured for their melt viscosities in the same manner as in Example 1 but by using a dry blend of an ethylene/vinyl alcohol copolymer (EVOH)[EP-F101B, manufactured by Kuraray Co.] having an ethylene content of 32 mol % as the functional resin B and the resin A at a weight ratio of 30:70.

Example 3

The melt viscosities were measured, a two-kind-three-layer film and a lid member were prepared, observed by using the SEM and were evaluated for their barrier properties in the same manner as in Example 1 but by melt-kneading poly(m-xylylene adipamide) (MXD6) resin pellets [6007: manufactured by Mitsubishi Gas Kagaku Co.] as the functional resin B immediately after having unsealed the moisture-proof package to which cobalt neodecanate [DICANATE 5000: manufactured by Dainihon Ink Kagaku Kogyo Co.] had been adhered in an amount of 400 ppm calculated as cobalt to prepare pellets of an oxygen-absorbing resin composition.

Example 4

A two-kind-three-layer film and a lid member were prepared, observed by using the SEM, evaluated for their barrier properties and measured for their melt viscosities in the same manner as in Example 1 but by using a poly(m-xylylene adipamide) resin [T-600: manufactured by Toyo Boseki Co.] having a terminal amino group concentration of 87 eq/$10^6$ g which is the functional resin B immediately after having unsealed the moisture-proof package as a base material, and kneading an oxygen-absorbing resin composition containing 5% by weight of-a liquid maleic anhydride-modified polybutadiene [M-2000-20: manufactured by Nihon Sekiyu Kagaku Co.] and 350 ppm of cobalt neodecanate [DICNATE 500: manufactured by Dainihon Ink Kagaku Kogyo Co.] calculated as a metal to prepare pellets of an oxygen-absorbing resin composition.

In this embodiment, further, an average domain diameter and a parameter Q were found from the electron microphotographs.

Next, the above two-kind-three-layer film was biaxially drawn into 3 times in the longitudinal direction and 3 times in the transverse direction at 105° C. at a drawing rate of 20 m/min by using a biaxially drawing machine [manufactured by Toyo Seiki Seisakusho Co.] to measure the haze of the multi-layer film.

Then, a polypropylene sheet [TOREFAN N0: manufactured by Toray Gosei Film Co.] having a thickness of 50 μm was laminated on one surface thereof via an adhesive {a mixed solution of TM-280 [manufactured by Toyo Morton Co.]:CAT-RT3 [manufactured by Toyo Morton Co.]:ethyl acetate (68.0:6.1:62.6)} to obtain a lid member. The heat-sealing was effected by using the above polypropylene sheet as a heat-sealing layer. After preserved at 22° C. for 7 days, the amount of oxygen that has passed through was measured to evaluate the oxygen barrier property.

Example 5

The melt viscosity was measured, a two-kind-three-layer film and a lid member were prepared and observed using the SEM, haze was measured, an average domain diameter and a parameter Q were calculated, and barrier property was evaluated in the same manner as in Example 4 but by using a dry blend of the functional resin B and the resin A at a weight ratio of 40:60 as an intermediate layer.

Example 6

The melt viscosity was measured, a two-kind-three-layer film and a lid member were prepared and observed using the SEM, haze was measured, an average domain diameter and a parameter Q were calculated, and barrier property was evaluated in the same manner as in Example 4 but by using a dry blend of the functional resin B and the resin A at a weight ratio of 30:70 as an intermediate layer.

Example 7

The melt viscosity was measured, a two-kind-three-layer film and a lid member were prepared and observed using the SEM, haze was measured, an average domain diameter and a parameter Q were calculated, and barrier property was evaluated in the same manner as in Example 4 but by using a dry blend of the functional resin B and the resin A at a weight ratio of 20:80 as an intermediate layer.

Example 8

There was used a co-injection molding machine including three injection machines, i.e., an injection machine (a) for inner and outer PET layers, (b) an injection machine for an intermediate PET layer, and (c) an injection machine for a functional intermediate layer. A polyethylene terephthalate [RT543C: manufactured by Nihon Unipet Co.] dried at 150° C. for 4 hours was fed to the injection machines (a) and (b), and a dry blend of the functional resin B and the resin A fed-to the extruder for the intermediate layer of Example 4, was fed to the injection machine (c) thereby to injection-mold a two-kind-five-layer multi-layer preform including the inner and outer layers, the intermediate layer which was the PET layer, and functional intermediate layers among them. The preform weighed 26.5 g and in which the functional intermediate layer weighed 3% by weight. The obtained preform was biaxially draw-blow-molded to prepare a two-kind-five-layer multi-layer bottle which was, then, filled with oxygen-free water and was preserved at 22° C., 60% for 14 days to measure the concentration of oxygen dissolved in water in the container. Further, the cross section of the multi-layer bottle preform was observed by using the SEM to find an average domain diameter and a parameter Q. The shoulder portion of the bottle was measured for its haze.

Example 9

A multi-layer bottle was filled with oxygen-free water, preserved at 22° C., 60% for 14 days, and the concentration of oxygen dissolved in water in the container was measured in the same manner as in Example 8 but by using a dry blend of the functional resin B and the resin A at a weight ratio of 40:60 as the intermediate layer. Like in Example 8, further, the cross section of the multi-layer bottle preform was observed by using the SEM to find an average domain diameter and a parameter Q. The shoulder portion of the bottle was measured for its haze.

Example 10

A multi-layer bottle was filled with oxygen-free water, preserved at 22° C., 60% for 14 days, and the concentration of oxygen dissolved in water in the container was measured in the same manner as in Example 8 but by using a dry blend of the functional resin B and the resin A at a weight ratio of 30:70 as the intermediate layer. Like in Example 8, further, the cross section of the multi-layer bottle preform was observed by using the SEM to find an average domain diameter and a parameter Q. The shoulder portion of the bottle was measured for its haze.

Comparative Example 1

A two-kind-three-layer film and a lid member were prepared, observed by using the SEM and were evaluated for their barrier properties in the same manner as in Example 1 but by using the PET only as the intermediate layer.

In this Comparative Example, the resin A and the functional resin B were not measured for their melt viscosities since they were both PET.

Comparative Example 2

Melt viscosities were measured, a two-kind-three-layer film and a lid member were prepared and were evaluated for their interlayer peeling in the same manner as in Example 1 but by using a dry blend of a polyethylene (PE)[SUMIKASEN L705, manufactured by Sumitomo Kagaku Co.] and a polyethylene terephthalate resin [RT543C: manufactured by Nihon Unipet Co.] at a weight ratio of 50:50 as the intermediate layer.

Comparative Example 3

Melt viscosities were measured, a two-kind-three-layer film and a lid member were prepared and were evaluated for their interlayer peeling in the same manner as in Example 1 but by using a dry blend of a polypropylene (PP)[NOVAK PP FG3D, manufactured by Nihon Polychem Co.] and a polyethylene terephthalate resin [RT543C: manufactured by Nihon Unipet Co.] at a weight ratio of 50:50 as the intermediate layer.

Comparative Example 4

Melt viscosities were measured, a two-kind-three-layer film and a lid member were prepared and were evaluated for their interlayer peeling in the same manner as in Example 1 but by using a dry blend of pellets of a poly(m-xylylene adipamide) (MXD6) resin [T-600: manufactured by Nihon Unipet Co.] and a polyethylene terephthalate resin [RT543C: manufactured by Nihon Unipet Co.] at a weight ratio of 50:50 as the intermediate layer.

Comparative Example 5

Melt viscosities were measured, a two-kind-three-layer film and a lid member were prepared and were evaluated for their interlayer peeling in the same manner as in Example 4 but by using a polyethylene(PE)[SUMIKASEN L705, manufactured by Sumitomo Kagaku Co.] as inner and outer layers, and setting the temperature of the extruder for inner and outer layers at 230° C.

Comparative Example 6

Melt viscosities were measured, a two-kind-three-layer film and a lid member were prepared and were evaluated for their interlayer peeling in the same manner as in Example 4 but by using a polypropylene (PP) [NOVAK PP FG3D, manufactured by Nihon Polychem Co.] as inner and outer layers, and setting the temperature of the extruder for inner and outer layers at 230° C.

Comparative Example 7

Melt viscosities were measured, a two-kind-three-layer film and a lid member were prepared, measured for their hazes, observed by using the SEM, calculated for their average domain diameters and parameters Q thereof, and were evaluated for their barrier property in the same manner as in Example 4 but by using a dry blend of the functional resin B and the resin A at a weight ratio of 10:90 as the intermediate layer.

Comparative Example 8

The cross section of a bottle preform was observed by using the electron microscope and the presence of interfaces was confirmed among the inner and outer layers and the intermediate layer in the same manner as in Example 8 but by feeding pellets of a dry blend of poly(m-xylylene adipamide) (MXD6) resin (T-600: manufactured by Nihon Unipet Co.) and a polyethylene terephthalate resin (RT543C: manufactured by Nihon Unipet Co.) at a weight ratio of 50:50 into an injection machine for a barrier layer.

In this Comparative Example, it was obvious that there was no adhesiveness since the interfaces could be confirmed among the inner and outer layers and the intermediate layer matrix. Therefore, there was no need of measuring the concentration of oxygen dissolved in water in the container, calculating the average domain diameter or the parameter Q, or measuring the shoulder portion of the bottle for its haze.

Comparative Example 9

A multi-layer bottle was filled with oxygen-free water, preserved at 22° C., 60% for 14 days, and the concentration of oxygen dissolved in water in the container was measured in the same manner as in Example 8 but by using a dry blend of the functional resin B and the resin A at a weight ratio of 60:40 as the intermediate layer. Like in Example 8, further, the cross section of the multi-layer bottle preform was observed by using the SEM to find an average domain diameter and a parameter Q. The shoulder portion of the bottle was measured for its haze.

TABLE 1

|  | Inner and outer layers | Sea resin (A) | Sea composition (%) | Island resin (B) note 1 | Container shape | Adhesion |
|---|---|---|---|---|---|---|
| Ex. 1 | PET | PET | 43 | MXD6 | film | ○ |
| Ex. 2 | PET | PET | 66 | EVOH | film | ○ |
| Ex. 3 | PET | PET | 43 | MXD6/Co | film | ○ |
| Ex. 4 | PET | PET | 42 | MXD6/MA-Pbd/Co | film | ○ |
| Ex. 5 | PET | PET | 54 | MXD6/MA-Pbd/Co | film | ○ |
| Ex. 6 | PET | PET | 68 | MXD6/MA-Pbd/Co | film | ○ |
| Ex. 7 | PET | PET | 77 | MXD6/MA-Pbd/Co | film | ○ |
| Ex. 8 | PET | PET | 32 | MXD6/MA-Pbd/Co | bottle | ○ |
| Ex. 9 | PET | PET | 42 | MXD6/MA-Pbd/Co | bottle | ○ |
| Ex. 10 | PET | PET | 51 | MXD6/MA-Pbd/Co | bottle | ○ |
| Comp. Ex. 1 | PET | PET | 100 | PET | film | ○ |
| Comp. Ex. 2 | PET | PE | 40 | PET | film | X |
| Comp. Ex. 3 | PET | PP | 41 | PET | film | X |
| Comp. Ex. 4 | PET | MXD6 | 58 | PET | film | X |
| Comp. Ex. 5 | PE | PET | 42 | MXD6/MA-Pbd/Co | film | X |
| Comp. Ex. 6 | PP | PET | 42 | MXD6/MA-Pbd/Co | film | X |
| Comp. Ex. 7 | PET | PET | 83 | MXD6/MA-Pbd/Co | film | ○ |
| Comp. Ex. 8 | PET | MXD6 | 58 | PET | bottle | X |
| Comp. Ex. 9 | PET | PET | 11 | MXD6/MA-Pbd/Co | bottle | ○ |

TABLE 1-continued

|  | $O_2$ permeating amount (cc/day/m$^2$) | $O_2$ dissolved in water (ppb, 22° C., 2 weeks) | Viscosity | Average domein diameter (μm) | Parameter Q | Haze |
| --- | --- | --- | --- | --- | --- | --- |
| Ex. 1 | 51.5 | — | A < B | — | — | — |
| Ex. 2 | 45.0 | — | A > B | — | — | — |
| Ex. 3 | 40.5 | — | A < B | — | — | — |
| Ex. 4 | 21 | — | A < B | 3.2 | 0.71 | 18.4 |
| Ex. 5 | 32.0 | — | A < B | 2.4 | 0.68 | 19.8 |
| Ex. 6 | 46.8 | — | A < B | 1.3 | 0.85 | 10.9 |
| Ex. 7 | 62.7 | — | A < B | 1.03 | 0.80 | 12.9 |
| Ex. 8 | — | 377 | A < B | 1.6 | 0.69 | 18.2 |
| Ex. 9 | — | 239 | A < B | 1.6 | 0.74 | 15.3 |
| Ex. 10 | — | 254 | A < B | 1.1 | 0.81 | 14.2 |
| Comp. Ex. 1 | 99.3 | — | — | — | — | — |
| Comp. Ex. 2 | — | — | A < B | — | — | — |
| Comp. Ex. 3 | — | — | A < B | — | — | — |
| Comp. Ex. 4 | — | — | A > B | — | — | — |
| Comp. Ex. 5 | — | — | A < B | — | — | — |
| Comp. Ex. 6 | — | — | A < B | — | — | — |
| Comp. Ex. 7 | 96.5 | — | A < B | 0.91 | 0.88 | 11.1 |
| Comp. Ex. 8 | — | — | A > B | — | — | — |
| Comp. Ex. 9 | — | 346 | A < B | 4.3 | 0.58 | 31.2 |

Note 1)
Ma-Pbd: polybutadiene modified with maleic anhydride

The invention claimed is:

1. A multi-layer structure for packaging formed by at least an inner layer, an outer layer and an intermediate layer, said intermediate layer having an islands-in-a-sea structure comprising a resin A constituting sea portions and resin composition B constituting island portions, the resin composition B having gas-barrier and oxygen-absorbing properties and comprising a gas-barrier resin, an oxidizing organic component and a transition metal catalyst, the sea portions occupying not more than 80% of the area of the intermediate layer in cross section, and the inner layer and the outer layer being resins having adhesiveness to said resin A.

2. A multi-layer structure for packaging according to claim 1, wherein the island portions have an average domain diameter r of smaller than 3.5 μm and a dispersion parameter Q of larger than 0.68, the average domain diameter r being expressed by the following formula (1), $$r = \sum_{1}^{n} r_i / n \quad (1)$$

and the dispersion parameter Q being expressed by the following formula (2), $$Q = \sum_{1}^{n} Q_i \cdot \ln Q_i / \ln(1/n) \quad (2)$$

wherein $r_i$ is a domain diameter, n is a number of domains, and when a short diameter of domain is $a_i$ and a long diameter of domain is $b_i$, the domain diameter $r_i$ is $r_i = (a_i + b_i)/2$, and $$Q_i = \pi (r_i/2)^2 / \left( \sum_{1}^{n} \pi (r_i/2)^2 \right).$$

3. A multi-layer structure for packaging according to claim 1, wherein the resin A is a polyester.

4. A multi-layer structure for packaging according to claim 1, wherein the oxidizing organic component is not present in the sea portions comprising the resin A.

5. A multi-layer structure for packaging according to claim 1, wherein the organic resin B has a melt viscosity relatively higher than that of the resin A.

* * * * *